(12) United States Patent
Jucknath et al.

(10) Patent No.: US 7,856,955 B2
(45) Date of Patent: Dec. 28, 2010

(54) SUPPORTING SLEEVE FOR CYLINDER HEAD SCREWS AND CYLINDER HEAD

(75) Inventors: Peter Jucknath, Oberraden (DE); Rainer Krauss, Brettheim (DE)

(73) Assignee: Acument GmbH & Co. oHG (DE)

( * ) Notice: Subject to any disclaimer, the term of this patent is extended or adjusted under 35 U.S.C. 154(b) by 686 days.

(21) Appl. No.: 11/910,698

(22) PCT Filed: Feb. 13, 2006

(86) PCT No.: PCT/DE2006/000244

§ 371 (c)(1),
(2), (4) Date: Oct. 4, 2007

(87) PCT Pub. No.: WO2006/108368

PCT Pub. Date: Oct. 19, 2006

(65) Prior Publication Data

US 2010/0065007 A1   Mar. 18, 2010

(30) Foreign Application Priority Data

Apr. 13, 2005   (DE) .................. 20 2005 005 872 U

(51) Int. Cl.
*F02F 1/24* (2006.01)
*F16B 25/00* (2006.01)
(52) U.S. Cl. .................................... 123/193.3; 411/178
(58) Field of Classification Search ............... 123/193.3, 123/193.5; 411/178.4, 412
See application file for complete search history.

(56) References Cited

U.S. PATENT DOCUMENTS

| 2,795,221 | A | * | 6/1957 | Braendel | ................ 123/169 R |
| 3,190,169 | A | | 6/1965 | Rosan | |
| 3,911,781 | A | * | 10/1975 | Bappert | ...................... 411/418 |
| 5,069,176 | A | | 12/1991 | Ruf et al. | |
| 7,056,075 | B2 | * | 6/2006 | Powers et al. | ............... 411/178 |
| 7,441,998 | B2 | * | 10/2008 | Gahler et al. | ............... 411/178 |

FOREIGN PATENT DOCUMENTS

| DE | 1113335 | 8/1961 |
| FR | 1303509 | 9/1962 |

OTHER PUBLICATIONS

English translation of the International Preliminary Report on Patentability which was received in connection with corresponding International Application No. PCT/DE2006/000244 on Mar. 19, 2008.
International Search Report which issued in connection with corresponding Application No. PCT/DE2006/000244 on Jun. 29, 2006.
German Language International Preliminary Examination Report which issued in connection with corresponding Application No. PCT/DE/2006/000244 on Jul. 19, 2007.

\* cited by examiner

*Primary Examiner*—M. McMahon
(74) *Attorney, Agent, or Firm*—Clark Hill PLC

(57) ABSTRACT

The invention relates to a supporting sleeve (10) for cylinder head screws, which is provided with a self-threading external thread.

4 Claims, 1 Drawing Sheet

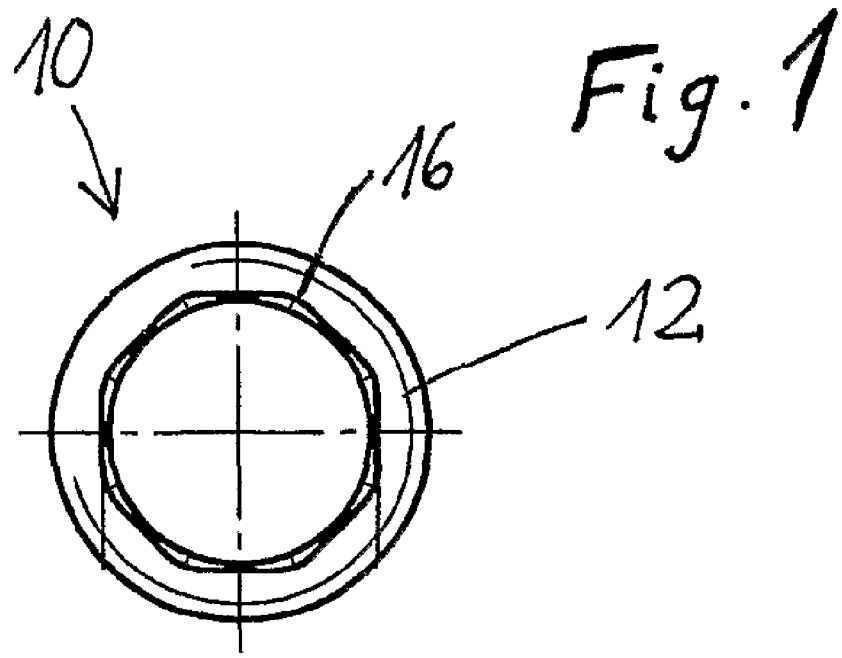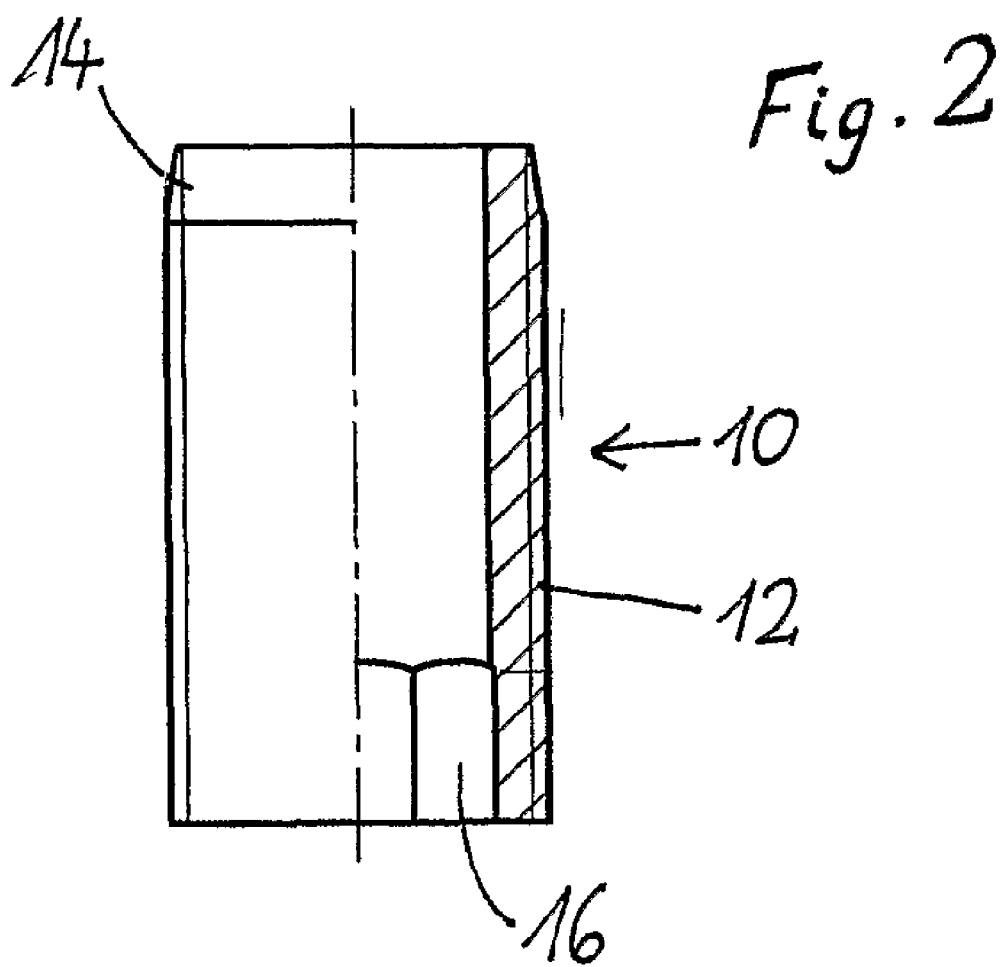

SUPPORTING SLEEVE FOR CYLINDER HEAD SCREWS AND CYLINDER HEAD

RELATED/PRIORITY APPLICATION

This application is a National Phase filing regarding International Application No. PCT/DE2006/000244, filed on Feb. 13, 2006. International Application No. PCT/DE2006/000244 relies upon German Application No. 20 2005 005 872.6, filed on Apr. 13, 2005, for priority.

The present invention is relating to a supporting sleeve for cylinder head screws and to a cylinder head of aluminum.

In connection with cylinder heads of aluminium, the clamping force of the cylinder head screws, in many cases, is too large to be taken by the aluminum material. For this reason, it is necessary to insert into the cylinder head supporting sleeves, which, in the most cases, are manufactured from steel and which are taking the forces of the cylinder head screws and are transferring these into the material.

According to the prior art, these supporting sleeves either are connected with the cylinder heads of aluminum during the casting thereof or later are screwed into threads in the cylinder heads.

In connection with these solutions according to the prior art, the following problems did occur:

With the supporting sleeves included during the casting, it is very difficult to ensure the correct positioning of the supporting sleeves during the casting.

When screwing supporting sleeves in, it is necessary to cut firstly a corresponding thread in the openings of the cylinder head. Further, then in many cases a bad seat of the supporting sleeves in the pre-cut threads occurs since the threads of the supporting sleeves and of the cylinder head are not perfectly matching.

With the screwed-in supporting sleeves further the additional expenditure of work for cutting the threads and the cleaning of the cut threads before the insertion of the supporting sleeves is especially increasing the costs.

It is therefore the task to be solved by the present invention to provide a supporting sleeve for cylinder head screws as well as a cylinder head in which with a small technical expenditure the supporting sleeve in a perfect position and with a perfect matching of the thread of the supporting sleeve and the cylinder head can be inserted.

According to the invention, this task is solved by a supporting sleeve for cylinder head screws which is provided with a self-threading external thread as well as by a cylinder head of aluminum in which the abutment bearings of the cylinder head screws are provided with supporting sleeves, wherein the supporting sleeves are positioned in threads which were self-threaded by the supporting sleeves during the mounting thereof.

In this way, the problems during casting the supporting sleeves in are completely avoided and nevertheless it is not necessary to provide threads in the openings for the cylinder head screws in the cylinder head before inserting the supporting sleeves. Contrary according to the invention, the supporting sleeves directly are turned into the openings of the cylinder head of aluminum, wherein these are threading their own thread. Hence as well the working step of cutting a thread as well as any problem of a mismatch between the previously cut interior thread in the cylinder head and the exterior thread of the supporting sleeves is avoided. Supporting sleeves according to the invention obviously can be advantageously used in other cases as in connection with cylinder heads in which two housings of aluminum castings or aluminum pressure castings have to be screwed together where the same problems are occurring as for example in connection with transmission housings.

It is especially preferred in this connection if the supporting sleeves are provided with a polyhedral interior drive. In this way, the self-threading positioning of the supporting sleeves in the cylinder head of aluminum is especially easy. Preferably, the interior drive in this connection is having eight plane surfaces which are positioned in parallel to the central axis of the supporting sleeve. By this arrangement, the supporting sleeve can be provided rather thin in spite of the fact that it is having a sufficient attack of forces.

Preferably, the supporting sleeve is cold forged from steel.

In the following, the present invention is more detailly described with reference to an exemplary embodiment shown in the drawings. In the drawings shows:

FIG. 1 a supporting sleeve according to the invention from the side from which is gripped by a tool and FIG. 2 a side view of the supporting sleeve of FIG. 1 partly in section.

FIG. 1 is showing a supporting sleeve 10 from the side on which it is having the drive, i.e. the gripping zone for the placing tool. Such a supporting sleeve 10 basically is consisting of a relatively thin hollow cylinder being open at the top and the bottom which is cold forged from steel. The supporting sleeve 10 according to the invention here on the outside is provided with a self-threading thread 12. On the end facing away from the viewer in FIG. 1 (this is the end with which ahead the supporting sleeve 10 is inserted into the corresponding opening in the cylinder head) the thread 12 is provided with a bevel 14 which is facilitating the self-threading of the thread 12. At the opposite end, the supporting sleeve 10 according to the invention is provided with an interior drive 16. This end of the supporting sleeve 10 is facing the viewer in FIG. 1 and is in FIG. 2 at the bottom. This interior drive 16 is serving as a force attack for the tool by the means of which the supporting sleeve 10 according to the invention is positioned in a corresponding opening in the cylinder head of aluminum which apart from this is not prepared in any way.

Preferably, this interior drive 16 is consisting of eight plane surfaces which are positioned in parallel to the central axis of the supporting sleeve 10 and are by the means of comparatively small radii merging into one in another.

Preferably, the supporting sleeve according to the invention is cold forged from steel.

The invention claimed is:

1. Supporting sleeve (10) for cylinder head screws having a self-threading external thread and being provided internally with a polyhedral interior drive (16), characterized in that the interior drive (16) is comprising eight plane surfaces which are positioned in parallel to the central axis of the supporting sleeve (10).

2. Supporting sleeve according to claim 1, characterized in that they are cold forged from steel.

3. Cylinder head of aluminum in which the abutment bearings of the cylinder head screws are provided with supporting sleeves (10) in which the supporting sleeves (10) are positioned in threads self-threaded during the mounting thereof with the supporting sleeves (10) being provided internally with a polyhedral interior drive (16), characterized in that the interior drive (16) of the supporting sleeves (10) is having eight plane surfaces which are positioned in parallel to the central axis of the supporting sleeves (10).

4. Cylinder head according to claim 3, characterized in that the supporting sleeves (10) are cold forged from steel.

* * * * *